(12) United States Patent
Nagai et al.

(10) Patent No.: US 7,520,191 B2
(45) Date of Patent: Apr. 21, 2009

(54) ACTUATOR

(75) Inventors: Shigekazu Nagai, Adachi-ku (JP); Akio Saitoh, Kawaguchi (JP); Masaki Imamura, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 703 days.

(21) Appl. No.: 10/989,638

(22) Filed: Nov. 17, 2004

(65) Prior Publication Data
US 2005/0109139 A1 May 26, 2005

(30) Foreign Application Priority Data
Nov. 21, 2003 (JP) ............................. 2003-392744

(51) Int. Cl.
*F16H 29/02* (2006.01)
(52) U.S. Cl. ..................... 74/89.33; 92/165 PR; 92/172
(58) Field of Classification Search ................ 74/89.33, 74/25, 89.32, 424.88; 92/137, 146, 161, 92/165 PR; 384/29, 41, 51, 42, 55
See application file for complete search history.

(56) References Cited

U.S. PATENT DOCUMENTS

| | | | | |
|---|---|---|---|---|
| 3,831,456 A | * | 8/1974 | Jahnke | 74/110 |
| 3,938,855 A | * | 2/1976 | Riegler et al. | 384/55 |
| 4,509,408 A | * | 4/1985 | Kuroda | 92/2 |
| 4,509,870 A | * | 4/1985 | Taki | 384/296 |
| 4,566,738 A | | 1/1986 | Fasth | |
| 4,582,368 A | * | 4/1986 | Fujita et al. | 384/13 |
| 4,656,881 A | | 4/1987 | Goedecke et al. | |
| 5,024,881 A | * | 6/1991 | Matucha et al. | 428/323 |
| 5,303,638 A | * | 4/1994 | Green | 92/88 |
| 5,333,535 A | * | 8/1994 | Miyamoto et al. | 92/88 |
| 5,445,045 A | * | 8/1995 | Nagai et al. | 74/490.09 |
| 5,501,526 A | * | 3/1996 | Asai et al. | 384/13 |
| 5,501,528 A | * | 3/1996 | Agari et al. | 384/45 |
| 5,570,769 A | * | 11/1996 | Eicher et al. | 192/143 |
| 5,609,091 A | * | 3/1997 | Stoll | 92/110 |
| 5,672,010 A | | 9/1997 | MacNicol et al. | |
| 5,676,016 A | * | 10/1997 | Nagai et al. | 74/89.32 |
| 5,676,038 A | | 10/1997 | Hosono et al. | |
| 5,735,610 A | * | 4/1998 | Mark et al. | 384/42 |
| 5,799,543 A | * | 9/1998 | Nagai et al. | 74/490.09 |
| 5,811,901 A | * | 9/1998 | Nagai et al. | 310/80 |
| 5,957,029 A | * | 9/1999 | Boyer et al. | 92/5 R |
| 6,007,247 A | * | 12/1999 | Rosengren et al. | 384/41 |
| 6,116,139 A | * | 9/2000 | Yuda et al. | 91/61 |

(Continued)

FOREIGN PATENT DOCUMENTS

CN          1048439 C      1/2000

(Continued)

*Primary Examiner*—Saúl J Rodriguez
*Assistant Examiner*—Phillip Johnson
(74) *Attorney, Agent, or Firm*—Paul A. Guss

(57) ABSTRACT

A guide mechanism, which guides a slider along an inner wall surface of a frame, includes a plurality of resin sliding members retained by the slider. The plurality of resin sliding members include a pair of first resin sliding members that make sliding movement along first sliding grooves formed in a bottom wall section of the frame, a pair of second resin sliding members that make sliding movement along second sliding grooves formed in side wall sections of the frame, and a pair of third resin sliding members that make sliding movement along third sliding grooves formed in the side wall sections.

8 Claims, 14 Drawing Sheets

U.S. PATENT DOCUMENTS

| | | | |
|---|---|---|---|
| 6,142,030 A * | 11/2000 | Nagai et al. | 74/89.32 |
| 6,191,548 B1 * | 2/2001 | Kajita et al. | 318/568.18 |
| 6,285,098 B1 * | 9/2001 | Nestler et al. | 310/12 |
| 6,308,614 B1 * | 10/2001 | Noda | 92/88 |
| 6,327,924 B2 * | 12/2001 | Nagai et al. | 74/89.36 |
| 6,505,543 B2 * | 1/2003 | Maffeis | 92/137 |
| 6,550,369 B2 * | 4/2003 | Sato et al. | 92/59 |
| 6,588,289 B2 * | 7/2003 | Ung et al. | 74/89.4 |
| 6,655,225 B1 * | 12/2003 | Nagai et al. | 74/89.33 |
| 2001/0039846 A1 * | 11/2001 | Nagai et al. | 74/89.36 |
| 2002/0066327 A1 * | 6/2002 | Nagai et al. | 74/89.33 |
| 2003/0000322 A1 * | 1/2003 | Nagai et al. | 74/89.36 |
| 2003/0005785 A1 * | 1/2003 | Ung et al. | 74/89.4 |
| 2004/0093970 A1 | 5/2004 | Iida et al. | |

FOREIGN PATENT DOCUMENTS

| | | |
|---|---|---|
| DE | 2 340 000 | 3/1978 |
| DE | 34 36 977 | 4/1986 |
| DE | 93 20 135 | 3/1994 |
| DE | 43 34 611 | 4/1994 |
| DE | 299 11 401 | 10/1999 |
| DE | 101 16 634 | 10/2002 |
| GB | 1 409 449 | 10/1975 |
| JP | 9-273550 | 10/1997 |
| JP | 2003-74551 | 3/2003 |

* cited by examiner

US 7,520,191 B2

ACTUATOR

BACKGROUND OF THE INVENTION

1. Field of the Invention

The present invention relates to an actuator that enables a slider to effect reciprocating motion linearly along a frame under the driving action of a driving source.

2. Description of the Related Art

A transport means such as an actuator has been hitherto used, for example, in order to transport a workpiece. Japanese Laid-Open Patent Publication No. 2003-74551 discloses an actuator implementing this conventional technique.

As shown in FIG. 14, the actuator comprises an inner block 2 that is displaceable in the axial direction within an outer rail 1. A ball screw shaft 3 is provided at a substantially central portion of the inner block 2 so that the ball screw shaft 3 extends in the axial direction.

A pair of first ball-rolling grooves 4 is formed in the axial direction along a pair of inner wall surfaces 1a, 1b of the outer rail 1 opposed to the inner block 2. Further, second ball-rolling grooves are formed on both side surfaces of the inner block 2 opposed to the first ball-rolling grooves 4 in the same manner as described above. Return passages 7, in which a plurality of balls 6 is circulated, are formed in the inner block 2. The balls 6 are circulated through the return passages 7, the first ball-rolling grooves 4, and the second ball-rolling grooves 2, and thus the inner block 2 is guided as it is displaced along the outer rail 1.

The ball screw shaft 3, which is integrally connected to a driving source such as an unillustrated electric motor, is rotated, whereby the inner block 2, which is screw-engaged with the ball screw shaft 3, is displaced linearly in the axial direction of the outer rail 1 under the rotary action of the ball screw shaft 3.

However, the actuator disclosed in Japanese Laid-Open Patent Publication No. 2003-74551 requires a plurality of balls 6, which roll along endless circulating tracks as the guide mechanism for guiding the inner block 2 in the axial direction of the outer rail 1. Further, it is necessary to perform highly accurate processing operations, for example, for forming the first ball-rolling grooves 4, the second ball-rolling grooves, and the return passages 7, in order to allow the balls 6 to roll smoothly therein. Therefore production costs for the actuator are expensive.

SUMMARY OF THE INVENTION

A general object of the present invention is to provide an actuator, which makes it possible to reduce production costs, by providing a simple guide mechanism structure for guiding a slider along a frame.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
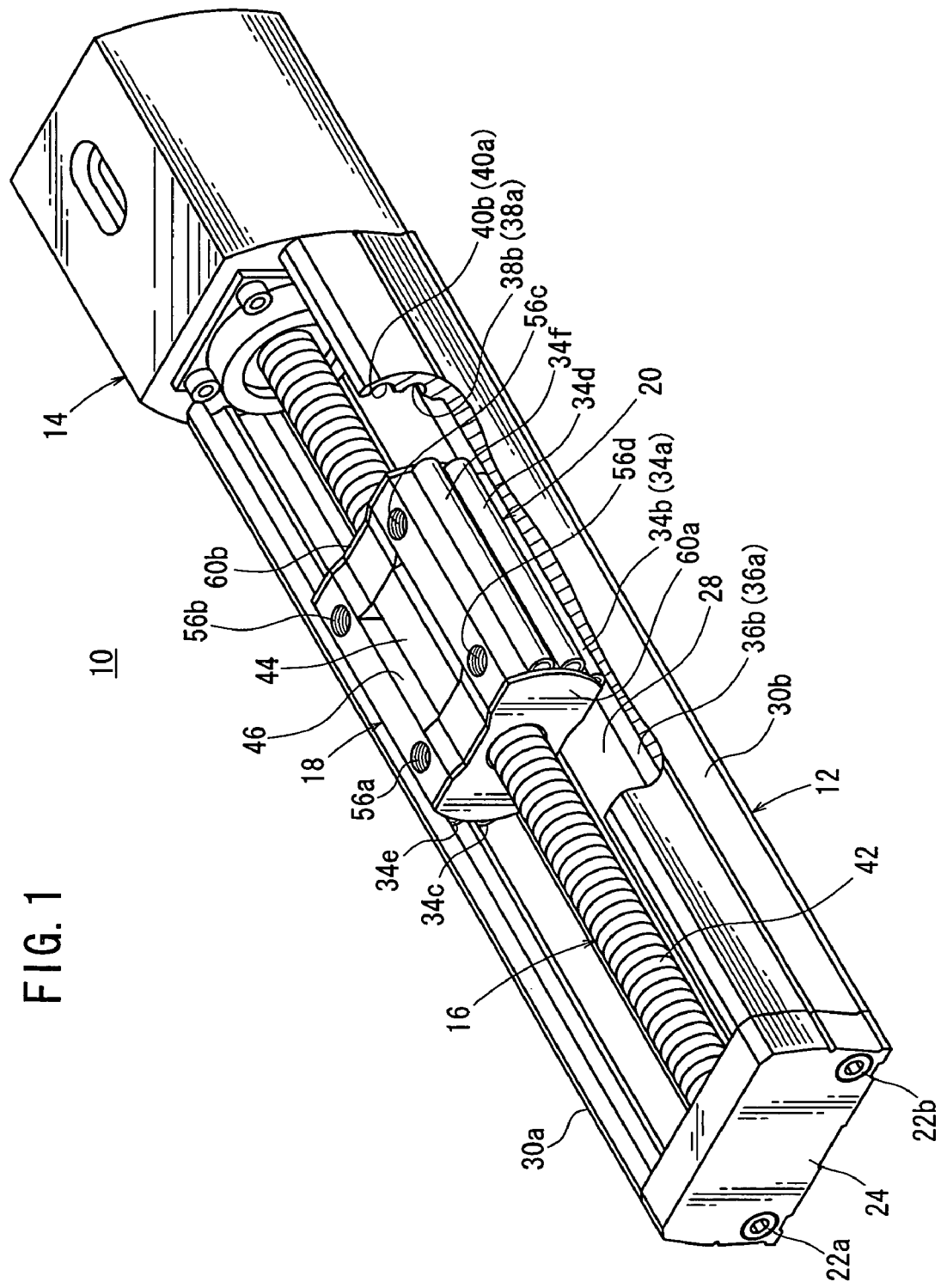
FIG. 1 shows, in partial cutout, a perspective view illustrating an actuator according to an embodiment of the present invention.

With reference to FIG. 1, reference numeral 10 indicates an actuator according to an embodiment of the present invention.

The actuator 10 comprises an elongate frame 12 having a substantially U-shaped vertical cross section, a rotary driving source 14 provided on one end side of the frame 12, a driving force-transmitting mechanism 16 for converting a rotary driving force of the rotary driving source 14 into rectilinear motion, a slider 18 which makes reciprocating motion in the axial direction along an inner wall surface of the frame 12, in accordance with the rectilinear motion transmitted via the driving force-transmitting mechanism 16, and a guide mechanism 20 for guiding the slider 18 linearly in the axial direction of the frame 12.

Preferably, each of the frame 12 and the slider 18 may be formed, for example, from a metal material such as aluminum, aluminum alloy, and stainless steel. The frame 12 is formed integrally, for example, by means of an extrusion forming or drawing forming process.

Figure 2:
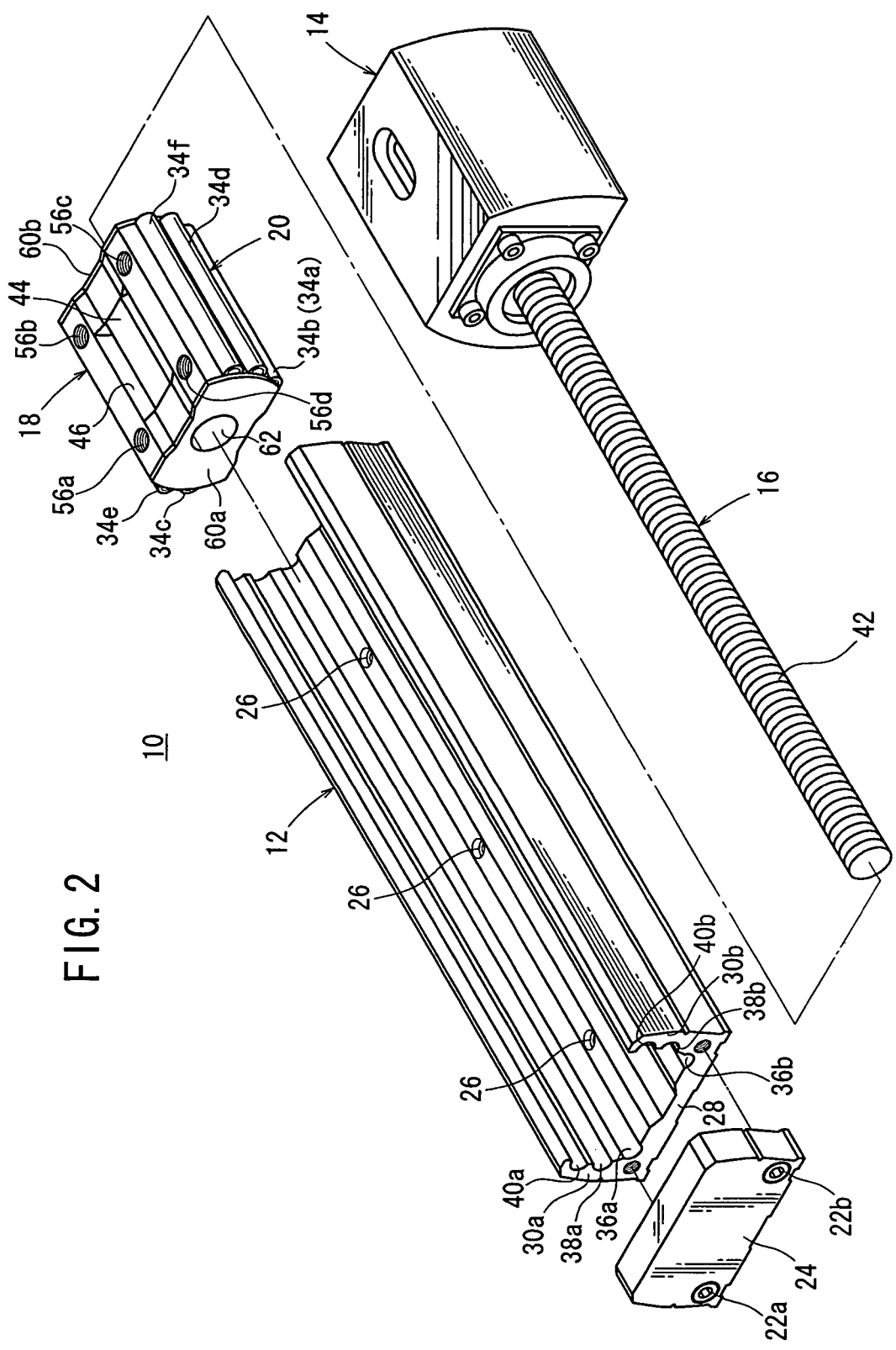
FIG. 2 shows an exploded perspective view illustrating the actuator shown in FIG. 1.

An end plate 24 is connected to another end of the frame 12 in the axial direction by a pair of screw members 22a, 22b (see FIGS. 1 and 2).

The frame 12 includes a bottom wall section 28, which is formed with a plurality of attachment holes 26 separated from each other by predetermined spacing distances in the axial direction (see FIG. 2), and a pair of mutually opposed side wall sections 30a, 30b that rise by a predetermined length in a substantially orthogonal direction from the bottom wall section 28. The bottom wall section 28 and the pair of side wall sections 30a, 30b are formed in an integrated manner (see FIG. 4).

Figure 4:
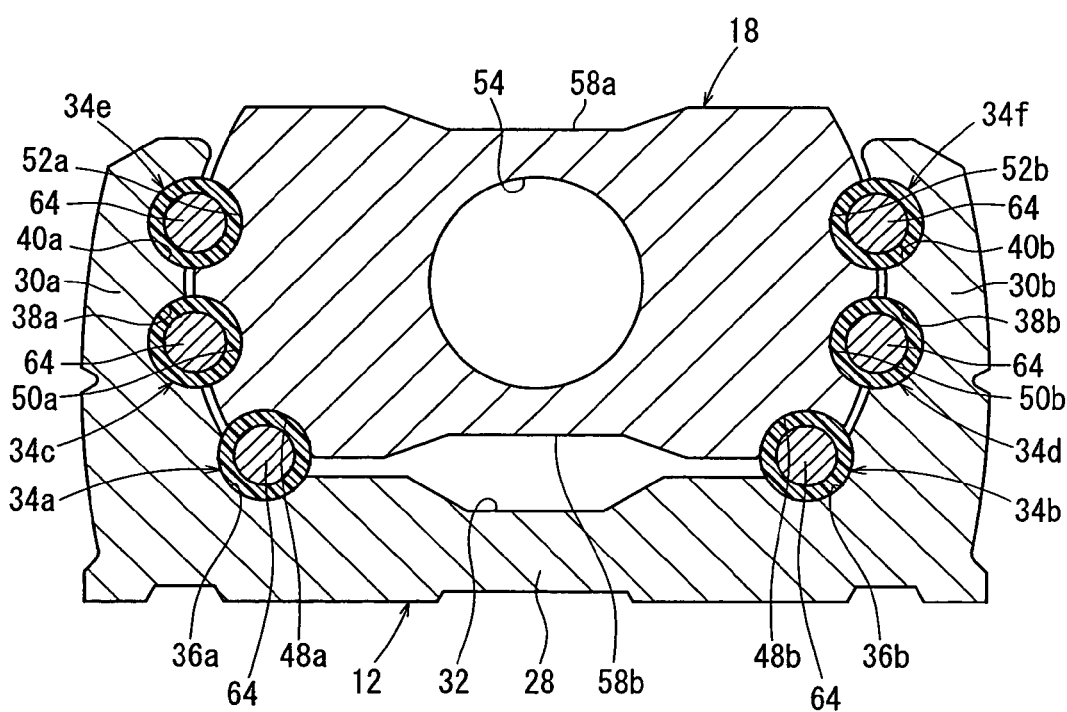
FIG. 4 shows a vertical sectional view taken along a plane perpendicular to the axial direction of the actuator shown in FIG. 1.

As shown in FIG. 4, a recess 32, which extends in the axial direction of the frame 12, is formed at a central portion of the inner wall surface of the bottom wall section 28. The entire inner wall surface of the side wall section 30a, 30b is formed to have a circular arc-shaped vertical cross section with a large radius of curvature. A pair of first sliding grooves 36a, 36b, each of which has a circular arc-shaped vertical cross section for permitting sliding movement of resin sliding members 34 therein as described later on, are formed along the inner wall surface of the bottom wall section 28 at positions proximate to the side wall sections 30a, 30b. The pair of first sliding grooves 36a, 36b are arranged to extend substantially in parallel in the axial direction from one end to the other of the frame 12.

Pairs of second sliding grooves 38a, 38b and third sliding grooves 40a, 40b, each of which has a circular arc-shaped vertical cross section for permitting sliding movement of resin sliding members 34 therein as described later on, are formed opposing each other on the inner wall surfaces of the pair of side wall sections 30a, 30b respectively. The pairs of second sliding grooves 38a, 38b and third sliding grooves 40a, 40b are formed so as to be located at respective vertical positions on the inner wall surfaces of the side wall sections 30a, 30b, extending substantially in parallel along the axial direction of the frame 12.

The driving force-transmitting mechanism 16 includes a feed screw shaft 42, which is connected coaxially to the drive shaft of the rotary driving source 14, and a substantially cylindrical feed nut 44 formed with a screw section 43 for making threaded engagement with the feed screw shaft 42. The feed nut 44 is installed into a hole of the slider 18 through an opening 46 formed on an upper surface of the slider 18 having a rectangular lateral cross section (see FIG. 3). Alternatively, for example, an unillustrated ball screw shaft or a slide screw shaft may be used in place of the feed screw shaft 42.

The side surfaces of the slider 18, which are opposed to the pair of side wall sections 30a, 30b of the frame 12, are formed to have circular arc-shaped vertical cross sections, each having a large radius of curvature corresponding to the inner wall surfaces of the side wall sections 30a, 30b respectively.

As shown in FIG. 4, the side surfaces of the slider 18 include a pair of first installation grooves 48a, 48b having circular arc-shaped vertical cross sections opposed to the first sliding grooves 36a, 36b disposed on the bottom wall section 28, wherein first resin sliding members 34a, 34b are installed therein as described later on. The side surfaces of the slider 18 also include a pair of second installation grooves 50a, 50b having circular arc-shaped vertical cross sections opposed to the second sliding grooves 38a, 38b disposed on the side wall sections 30a, 30b, wherein second resin sliding members 34c, 34d are installed therein as described later on. In addition, the side surfaces of the slider include a pair of third installation grooves 52a, 52b having circular arc-shaped vertical cross sections opposed to the third sliding grooves 40a, 40b disposed on the side wall sections 30a, 30b, wherein third resin sliding members 34e, 34f are installed therein as described later on.

An explanation will be made below while referring generally to the resin sliding members as "resin sliding members 34." The terms "first resin sliding members 34a, 34b," "second resin sliding members 34c, 34d" and "third resin sliding members 34e, 34f" shall be used when referring to the individual resin sliding members.

The first to third installation grooves 48a, 48b, 50a, 50b, 52a, 52b are arranged in pairs so that they extend substantially in parallel to each other in the axial direction of the feed screw shaft 42 respectively.

A through-hole 54, through which the feed screw shaft 42 penetrates, is formed at a central portion of the slider 18. Four attachment holes 56a to 56d, which are used for attaching another member to the slider 18, are formed on the upper surface of the slider 18. Recesses 58a, 58b are formed along the upper and lower surfaces of the slider 18 respectively (see FIG. 4).

A pair of plates 60a, 60b are fixed to both end surfaces of the slider 18 in the axial direction by means of unillustrated screw members. Circular holes 62, through which the feed screw shaft 42 may be inserted, are formed at central portions of the pair of plates 60a, 60b (see FIG. 3).

In this arrangement, both ends of the plurality of resin sliding members 34 are grasped respectively by the pair of plates 60a, 60b. Accordingly, the plurality of resin sliding members 34 installed to the slider 18 is prevented from being displaced in the axial direction, and the resin sliding members 34 are retained (fixed) by the slider 18. Further, the pair of plates 60a, 60b prevents the resin sliding members 34 from making rotary motions in the circumferential direction while engaged in the pairs of first to third installation grooves 48a, 48b, 50a, 50b, 52a, 52b formed on the side surfaces of the slider 18.

Alternatively, the pair of separately attachable plates 60a, 60b may be omitted by forming the slider 18 in an integral manner, into a shape that incorporates such plates 60a, 60b, for example, by means of casting. It is also possible that fixing members such as unillustrated pins may be provided, which are fastened to the first to third installation grooves 48a, 48b, 50a, 50b, 52a, 52b in place of the plates 60a, 60b. Moreover, it is also possible to fix the plurality of resin sliding members 34 directly to the first to third installation grooves 48a, 48b, 50a, 50b, 52a, 52b by means of an adhesive member or an adhesive substance.

Figure 3:
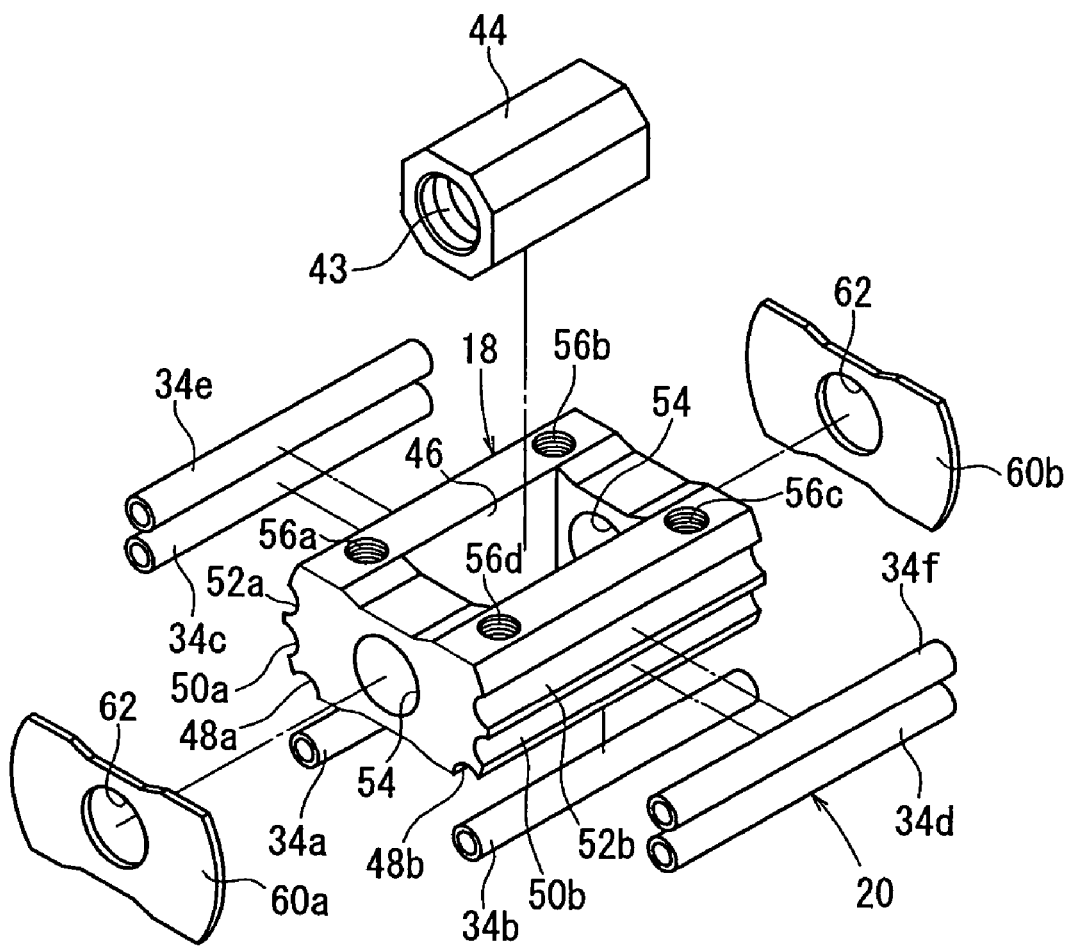
FIG. 3 shows an exploded perspective view illustrating details of a slider and a guide mechanism, which constitute elements of the actuator shown in FIG. 1.

As shown in FIGS. 3 and 4, the first to third resin sliding members 34a to 34f of the guide mechanism 20 make up six sliding members altogether, which are installed to the pairs of first to third installation grooves 48a, 48b, 50a, 50b, 52a, 52b formed along the side surface of the slider 18, and which slide along the pairs of first to third sliding grooves 36a, 36b, 38a, 38b, 40a, 40b formed along the inner wall surface of the frame 12. The first to third resin sliding members 34a to 34f are each constructed identically. Each of the first to third resin sliding members 34a to 34f comprises a hollow cylindrical member formed of, for example, ultrahigh molecular weight polyethylene, and a core member 64 that is inserted into the cylindrical member and formed of, for example, a column of SUS or steel.

The shape of the resin sliding member 34 is not limited to being round and/or columnar. The resin sliding member 34 could also be a pillar-shaped member including, for example, a prism-shaped member. Rigidity of the resin sliding member 34 is ensured by inserting the core member 64 made of metal into the cylindrical member composed of a resin material.

Further, by forcibly inserting a core member 64 having a predetermined diameter into the cylindrical member, to diametrally expand the cylindrical member made of the resin material, it is possible to regulate the outer diameter of the resin sliding member 34 so as to have a predetermined diameter. Therefore, it is possible to easily and accurately adjust the gaps between the resin sliding members 34 and the first to third installation grooves 48a, 48b, 50a, 50b, 52a, 52b in which the resin sliding members 34 are installed. Similarly, it is possible to easily and accurately adjust the gaps between the resin sliding members 34 and the first to third sliding grooves 36a, 36b, 38a, 38b, 40a, 40b in which the resin sliding members 34 are slidably disposed.

The actuator 10 according to this embodiment of the present invention is basically constructed as described above. Next, the operation, function, and effect of the actuator 10 shall be explained.

When an unillustrated power source is energized, the feed screw shaft 42, which is connected to the drive shaft of the rotary driving source 14, is driven and rotated. Such rotary motion is converted into rectilinear motion of the slider 18 as a result of threaded engagement between the feed screw shaft 42 and the screw section 43 of the feed nut 44. Therefore, the slider 18 is displaced in the axial direction of the frame 12 while being guided by the guide mechanism 20. When the polarity of the current flowing through the rotary driving source 14 is reversed from positive to negative and vice versa, the slider 18 makes reciprocating motion in the axial direction of the frame 12.

As the slider 18 makes reciprocating motion in the axial direction of the frame 12, the plurality of resin sliding members 34, which are retained on the side surfaces of the slider 18 by the pair of plates 60*a*, 60*b*, make sliding movement along the first to third sliding grooves 36*a*, 36*b*, 38*a*, 38*b*, 40*a*, 40*b* of the frame 12. Accordingly, the slider 18 is linearly displaced smoothly along the inner wall surfaces of the frame 12.

Figure 5:
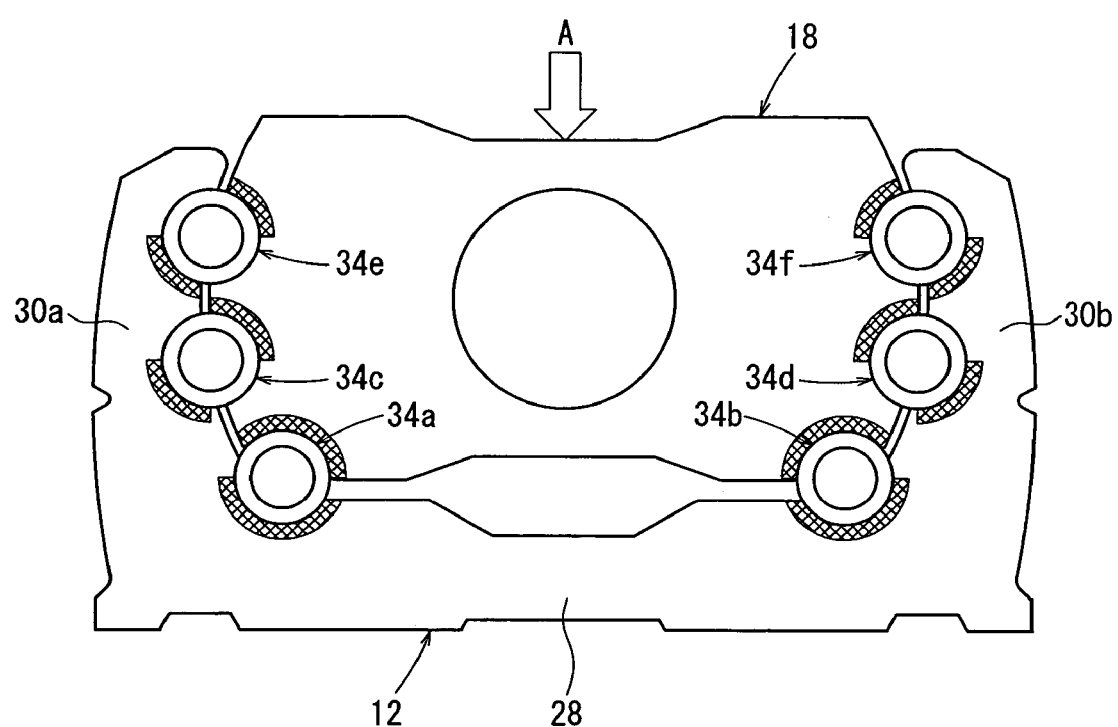
FIG. 5 shows a side view illustrating a state in which a vertical load is applied to the slider shown in FIG. 3.
Figure 6:
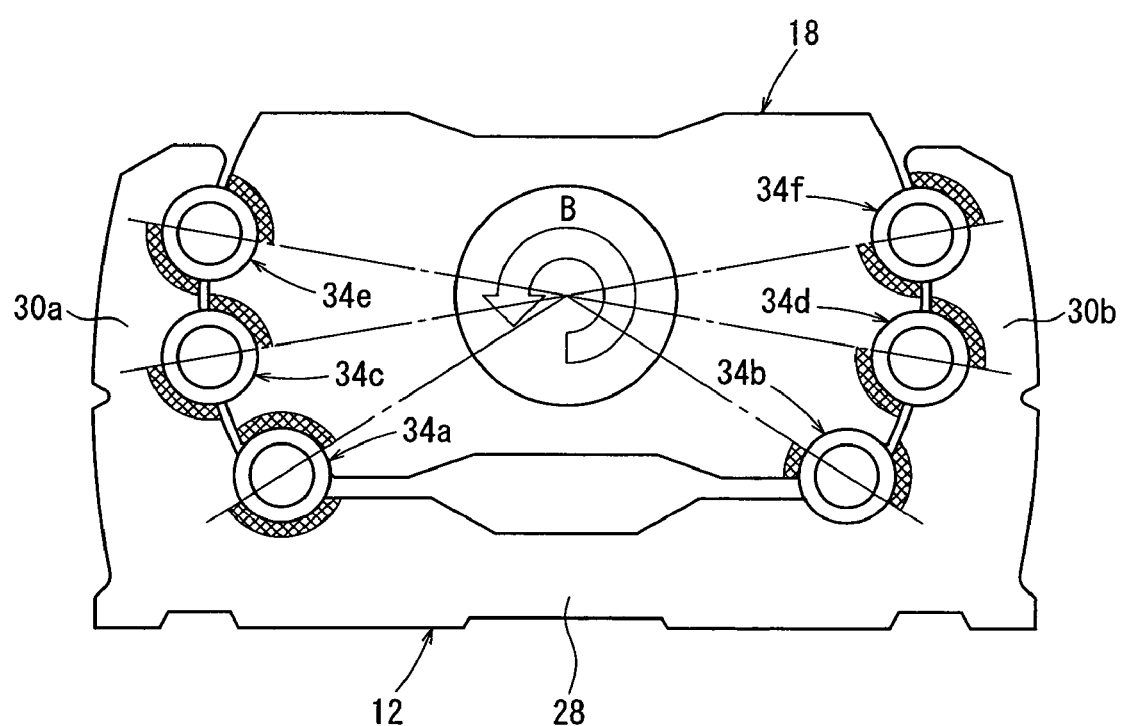
FIG. 6 shows a side view illustrating a state in which an unbalanced load is applied to the slider shown in FIG. 3.

Next, an explanation will be made concerning loads, which are absorbed by the plurality of resin sliding members 34. In FIGS. 5 and 6, the amounts by which such loads are supported are shown in simplified form by means of illustrated screened ranges.

As illustrated in FIG. 5, when a vertical load is applied to the slider 18 in a vertically downward direction (i.e., the direction of arrow A), the load is primarily supported by the downwardmost pair of first resin sliding members 34*a*, 34*b* which are engaged with the first sliding grooves 36*a*, 36*b* disposed in the bottom wall section 28. The load is secondarily supported by the four remaining sliding members, that is, the second resin sliding members 34*c*, 34*d* and the third resin sliding members 34*e*, 34*f* which are engaged with the second and third sliding grooves 38*a*, 38*b*, 40*a*, 40*b* disposed in the side wall sections 30*a*, 30*b*.

On the other hand, as shown in FIG. 6, when an unbalanced load, apart from the vertical load described above (for example, a load in the direction of arrow B), is applied to the slider 18, the six resin sliding members 34, which are arranged on the side wall sections 30*a*, 30*b* and the bottom wall section 28, disperse the unbalanced load substantially uniformly, so as to appropriately support the load.

In this embodiment of the present invention, the plurality of resin sliding members 34 are retained on both side surfaces of the slider 18. Accordingly, it is unnecessary to provide, for example, balls and return members, which have been required according to the conventional technique. Further, it is unnecessary to perform processing operations for forming return passages for circulating balls within the slider. Therefore, in accordance with this embodiment of the present invention, production costs are reduced owing to a simplified structure, in which a plurality of resin sliding members 34 are used for the guide mechanism 20. Thus, it is possible to manufacture the actuator inexpensively.

Further, in this embodiment of the present invention, when the frame 12 is formed in an integrated manner, for example, by an extrusion forming or drawing forming process, production costs can be further reduced by simultaneously forming the first to third sliding grooves 36*a*, 36*b*, 38*a*, 38*b*, 40*a*, 40*b* on the bottom wall section 28 and side wall sections 30*a*, 30*b* of the frame 12. With this procedure, it is unnecessary to perform downstream processing, such as additional finishing processing steps, for the first to third sliding grooves 36*a*, 36*b*, 38*a*, 38*b*, 40*a*, 40*b*.

Next, an explanation shall be made concerning the relational arrangement of the plurality of resin sliding members 34, which are interposed between side surfaces of the slider 18 and inner wall surfaces of the frame 12.

Figure 7:
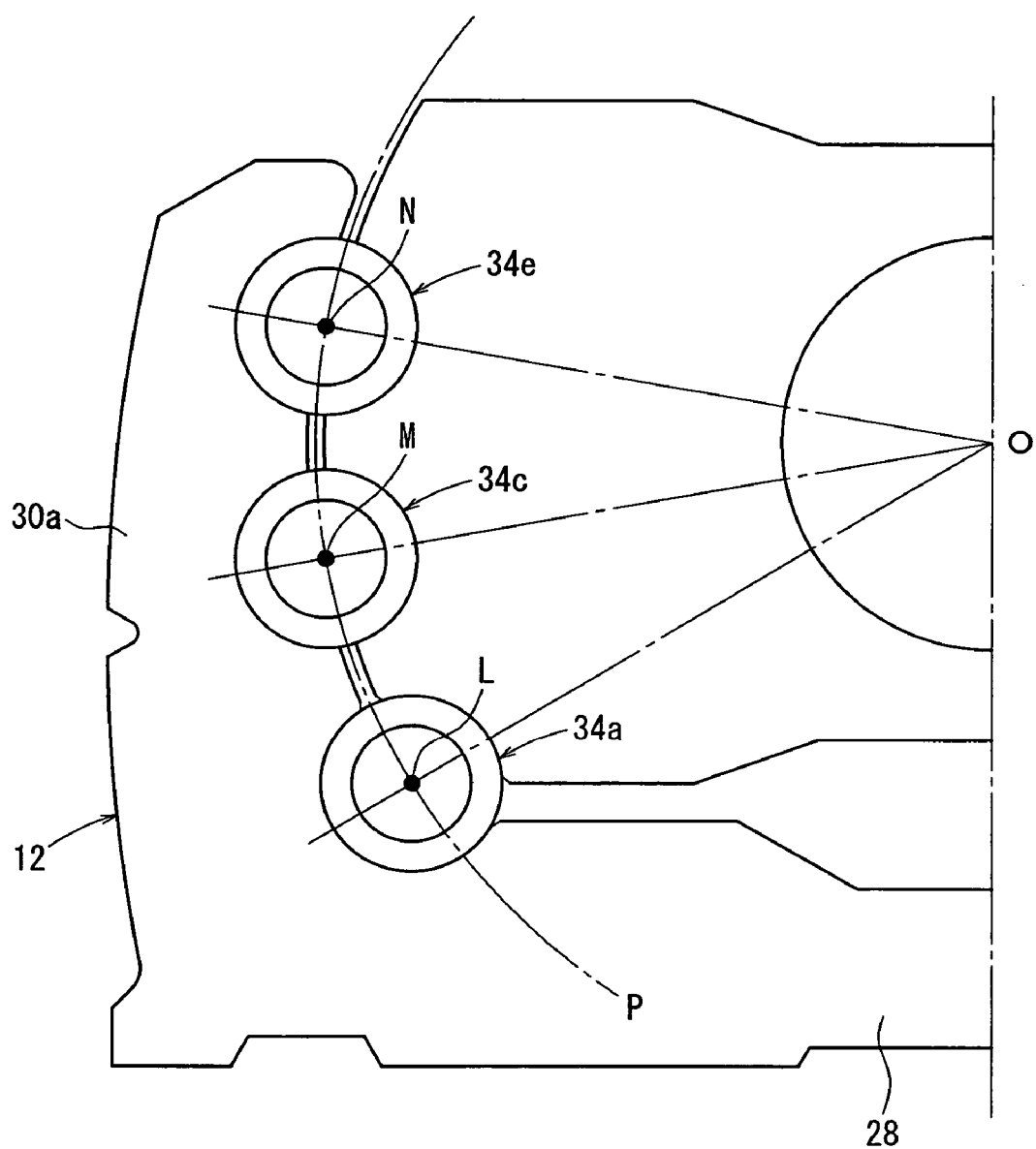
FIG. 7 shows a partial magnified side view illustrating a state in which a plurality of resin sliding members are arranged along an identical circumference.

As shown in FIG. 7, the plurality of resin sliding members 34, which are installed to the slider 18, are arranged so that the resin sliding members 34 are positioned on an identical circumference of a virtual circle P. The virtual circle P has a common center with the axial center O of the feed screw shaft 42, and the virtual circle P intersects each of the axial centers L, M, N of the plurality of first to third resin sliding members 34*a* (34*b*), 34*c* (34*d*), 34*e* (34*f*). In other words, identical distances are provided for the spacing distances from the axial center O of the feed screw shaft 42 to the axial centers L, M, N of the plurality of first to third resin sliding members 34*a* (34*b*), 34*c* (34*d*), 34*e* (34*f*). Accordingly, unbalanced loads (e.g., the unbalanced load in the direction of arrow B shown in FIG. 6) exerted on the slider 18 can be appropriately supported.

Figure 8:
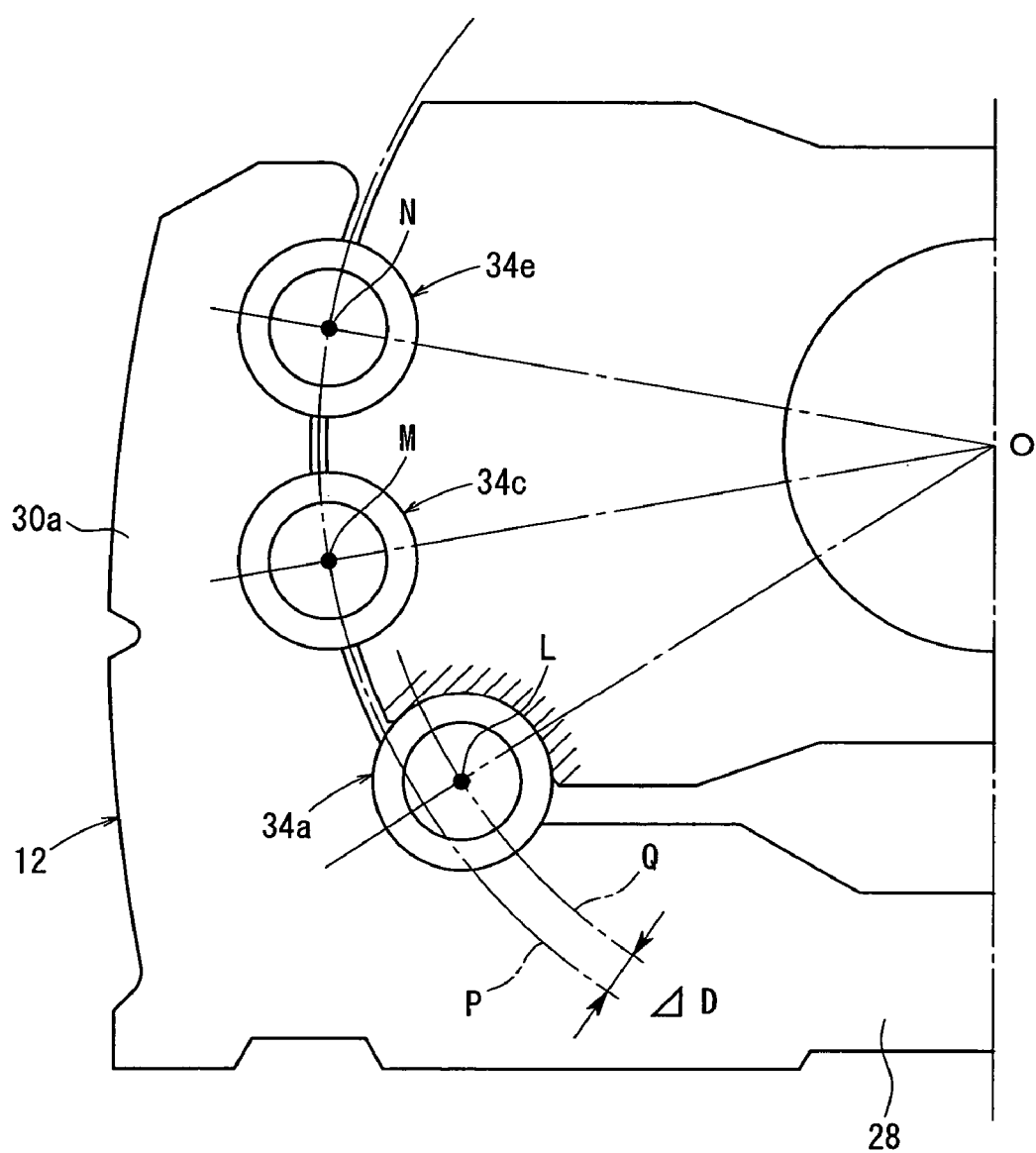
FIG. 8 shows a partial magnified side view illustrating a state in which a plurality of resin sliding members is arranged along different circumferences.

Alternatively, as shown in FIG. 8, the first resin sliding members 34*a*, 34*b*, which are supported by the bottom wall section 28 of the frame 12, and which are positioned lowest among the plurality of resin sliding members 34 installed in the slider 18, may be positioned on the circumference of a virtual circle Q which is disposed concentrically inwardly by a predetermined distance ΔD with respect to the virtual circle P, wherein the virtual circle P intersects the axial centers M, N of the other second and third resin sliding members 34*c* (34*d*), 34*e* (34*f*) that are supported by the side wall section 30*a* (30*b*) of the frame 12. With this arrangement, it is possible to increase the contact area (see the hatched portion in FIG. 8) between the contacting surface of the slider 18 and the first resin sliding members 34*a*, 34*b*.

The number for the plurality of resin sliding members 34 is not limited to six. Any plurality of resin sliding members 34 may be used and arranged at desired positions between the side surfaces of the slider 18 and the inner wall surfaces of the frame 12, and accordingly, it is possible to obtain a desired effect in conformity with the demands of the user.

Figure 9:
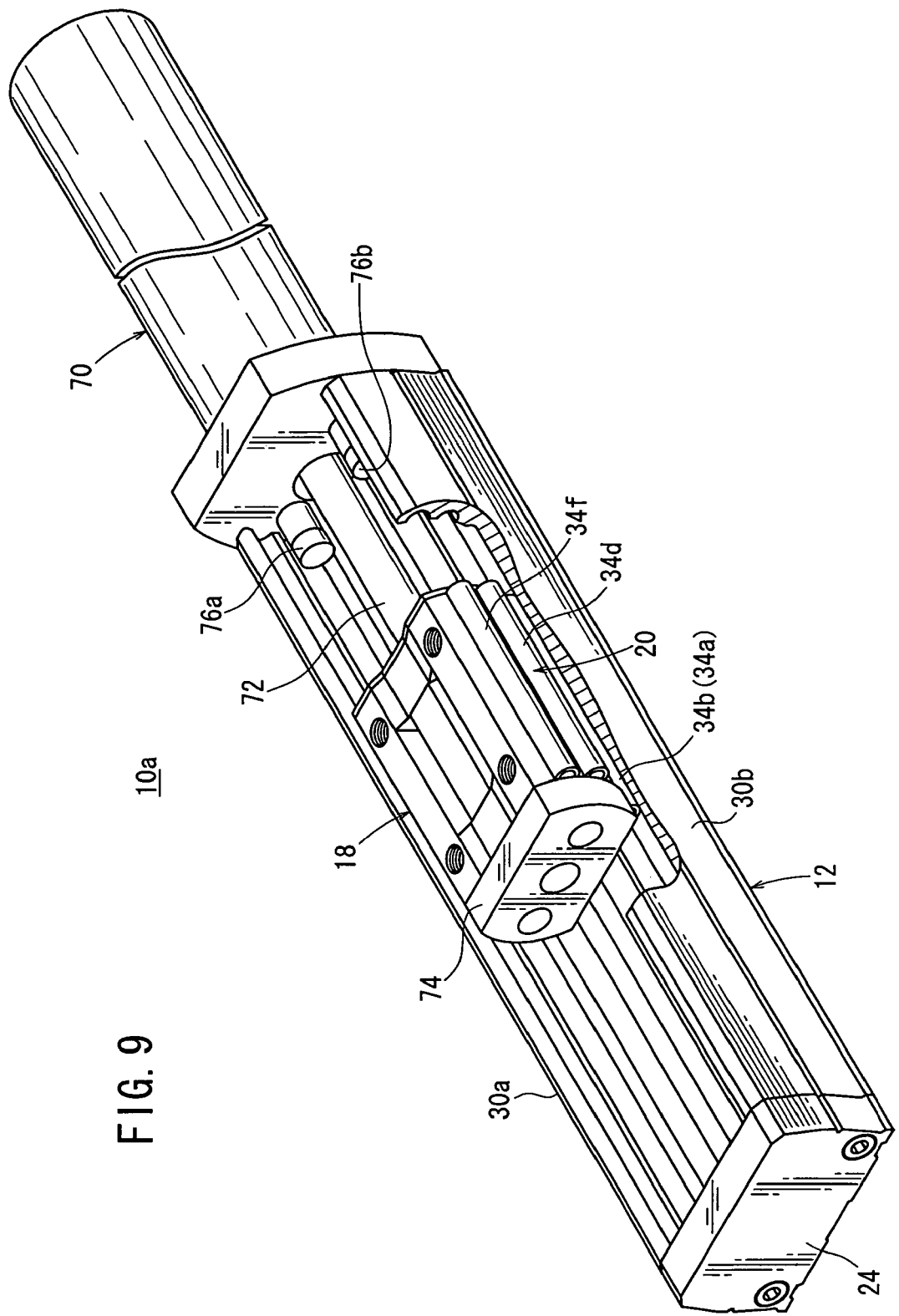
FIG. 9 shows, in partial cutout, a perspective view illustrating an actuator according to another embodiment of the present invention.

The above embodiment of the present invention has been explained as using, for example, a rotary driving source 14 such as a motor as the driving source. However, the invention is not limited to using a rotary driving source. As shown in FIG. 9, a fluid pressure cylinder 70 may be used as the driving source in place of the rotary driving source 14.

When a pressure fluid is supplied to an unillustrated cylinder chamber of the fluid pressure cylinder 70, a piston rod 72 makes reciprocating movement. A slider 18 thereby makes reciprocating motion in the axial direction of a frame 12 via an end plate 74 that is connected to the forward end of the piston rod 72. In FIG. 9, reference numerals 76*a*, 76*b* indicate shock absorbers for absorbing shocks that may occur when the slider 18 is displaced toward a terminal end position.

Further, when an unillustrated sensor installed on a side surface of the frame 12 detects an unillustrated detection object that is attached to and displaced integrally with the slider 18, it is possible to detect a home position of the slider 18.

FIGS. 10 to 13 show actuators 80, 110 according to still further embodiments of the present invention. The following embodiments also make use of a fluid pressure cylinder as the driving source.

Figure 10:
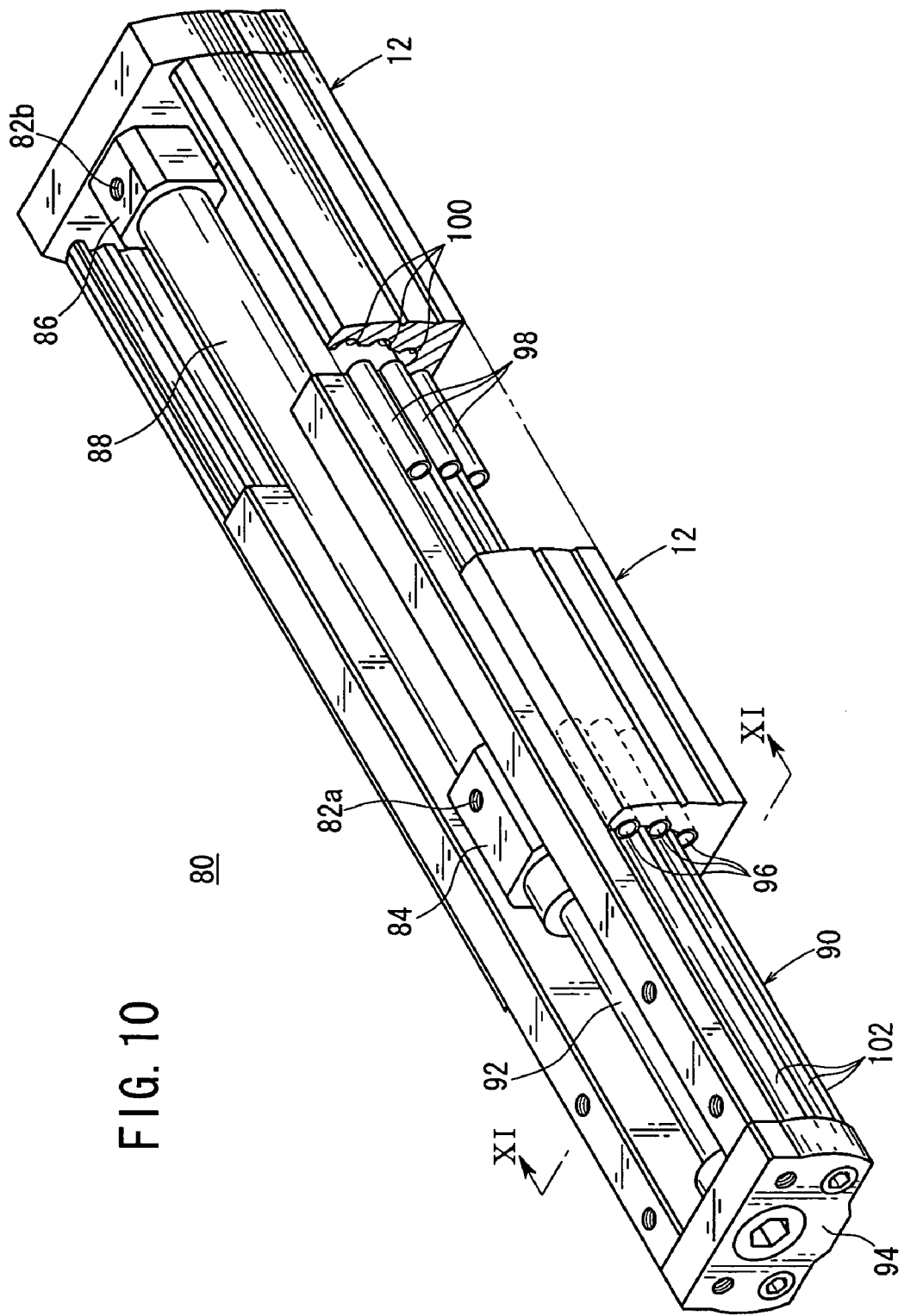
FIG. 10 shows, in partial cutout, a perspective view illustrating an actuator according to still another embodiment of the present invention.
Figure 11:
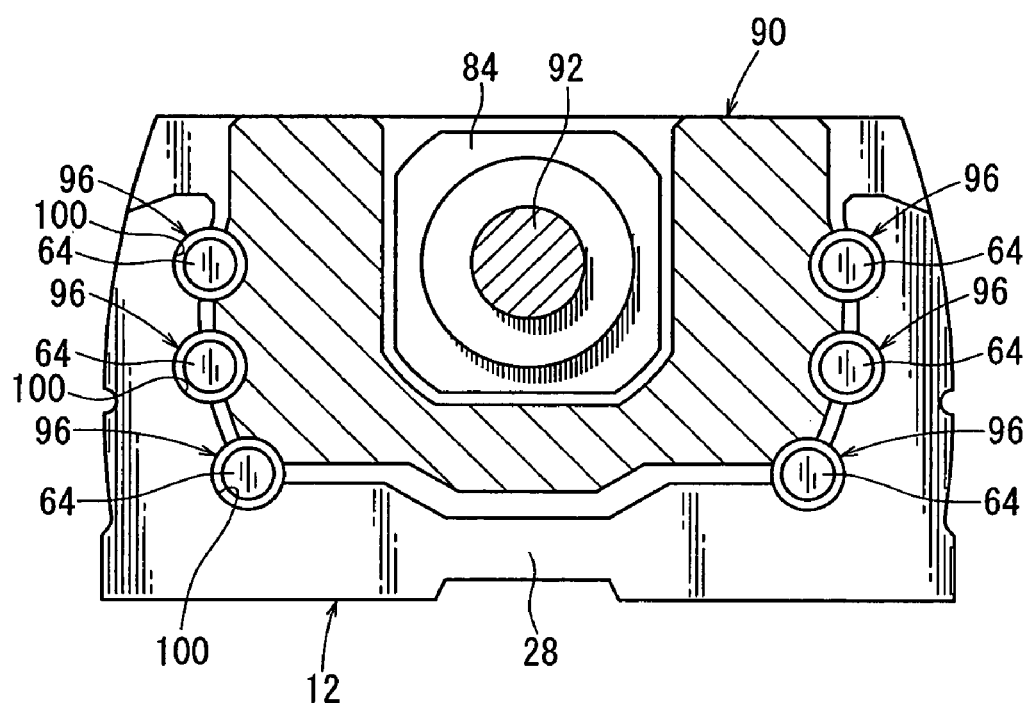
FIG. 11 shows a vertical sectional view taken along line XI-XI shown in FIG. 10.

The actuator 80 shown in FIGS. 10 and 11 comprises a rod cover 84 and a head cover 86, each containing pressure fluid inlet/outlet ports 82a, 82b, and a cylinder tube 88 with a piston accommodated in an unillustrated cylinder chamber which is closed by the rod cover 84 and the head cover 86. The cylinder tube 88 is fixed along a recess of the slider 90 and a frame 12. A slider 90, which has a U-shaped cross section and which extends in the axial direction of the frame 12, is connected via a connecting block 94 to the forward end of a piston rod 92 that makes expanding/contracting motions toward the outside from one end of the cylinder tube 88.

A plurality of fixed resin sliding members 96 and a plurality of movable resin sliding members 98, separated by predetermined spacing distances in the axial direction respectively, are provided between the stationary frame 12 and the movable slider 90. More specifically, the fixed resin sliding members 96, numbering six in total with three on each side, are fixed to ends of a plurality of long grooves 100 formed on the inner wall surfaces of the frame 12. The movable resin sliding members 98, numbering six in total with three on each side, are fixed to ends of a plurality of long grooves 102 formed on the outer wall surfaces of the movable slider 90.

Therefore, when the piston rod 92 and the slider 90 move reciprocally back and forth in an integrated manner under an urging action of the fluid pressure cylinder, loads (including vertical and unbalanced loads), which are applied to the slider 90, are supported appropriately by the plurality of fixed resin sliding members 96 retained on the inner walls of the stationary frame 12 and the plurality of movable resin sliding members 98 retained on the outer walls of the movable slider 90.

The plurality of fixed resin sliding members 96 and the plurality of movable resin sliding members 98 are disposed within identical long grooves 100 along a common horizontal line. However, even when the slider 90 is displaced along the frame 12, the plurality of fixed resin sliding members 96 and the plurality of movable resin sliding members 98 do not come into abutment with each other, by means of setting the stroke amount of the piston to a predetermined amount, or by providing an unillustrated stopper for restricting the displacement amount of the slider 90.

Figure 12:
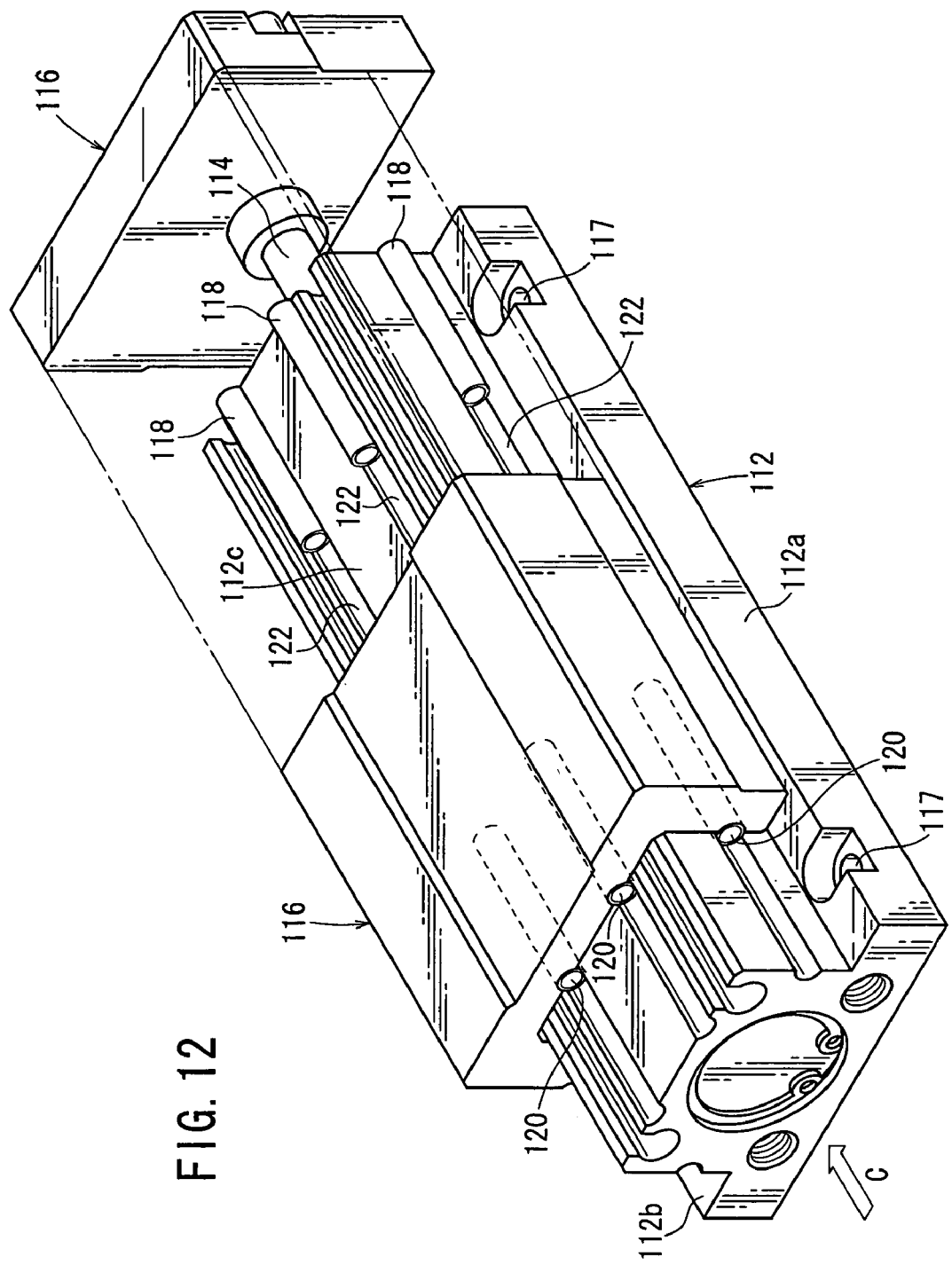
FIG. 12 shows, in partial cutout, a perspective view illustrating an actuator according to still another embodiment of the present invention.
Figure 13:
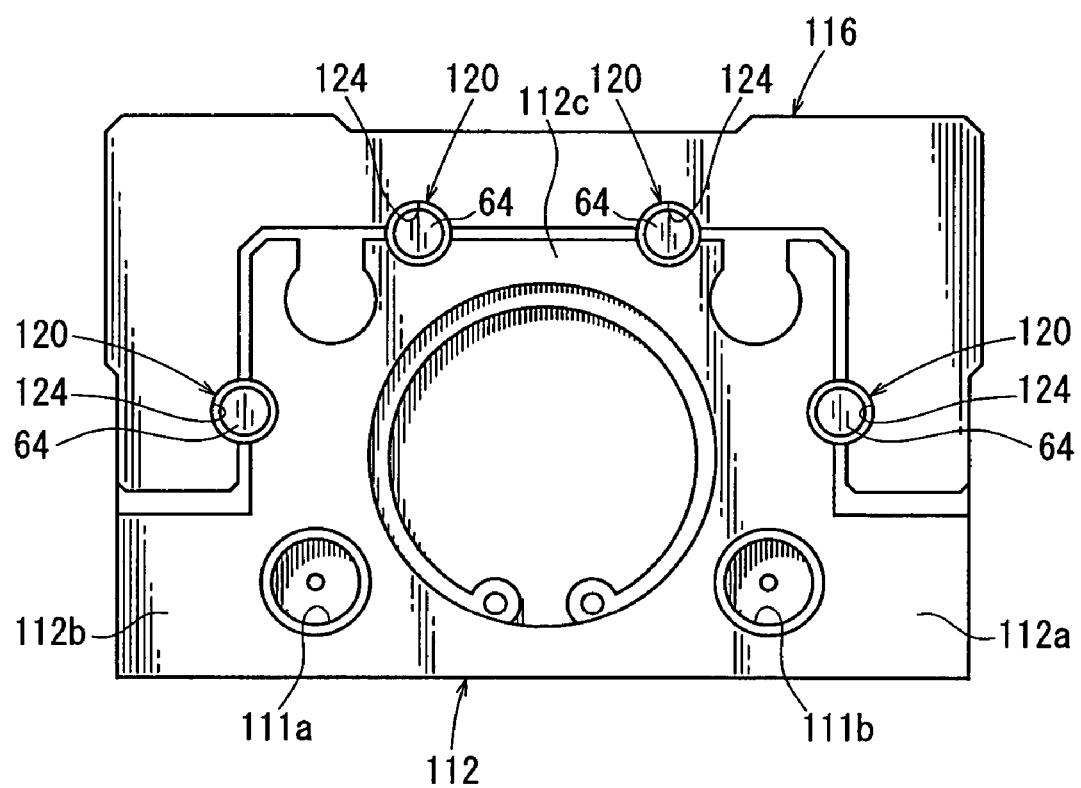
FIG. 13 shows a view in the direction of arrow C shown in FIG. 12.
Figure 14:
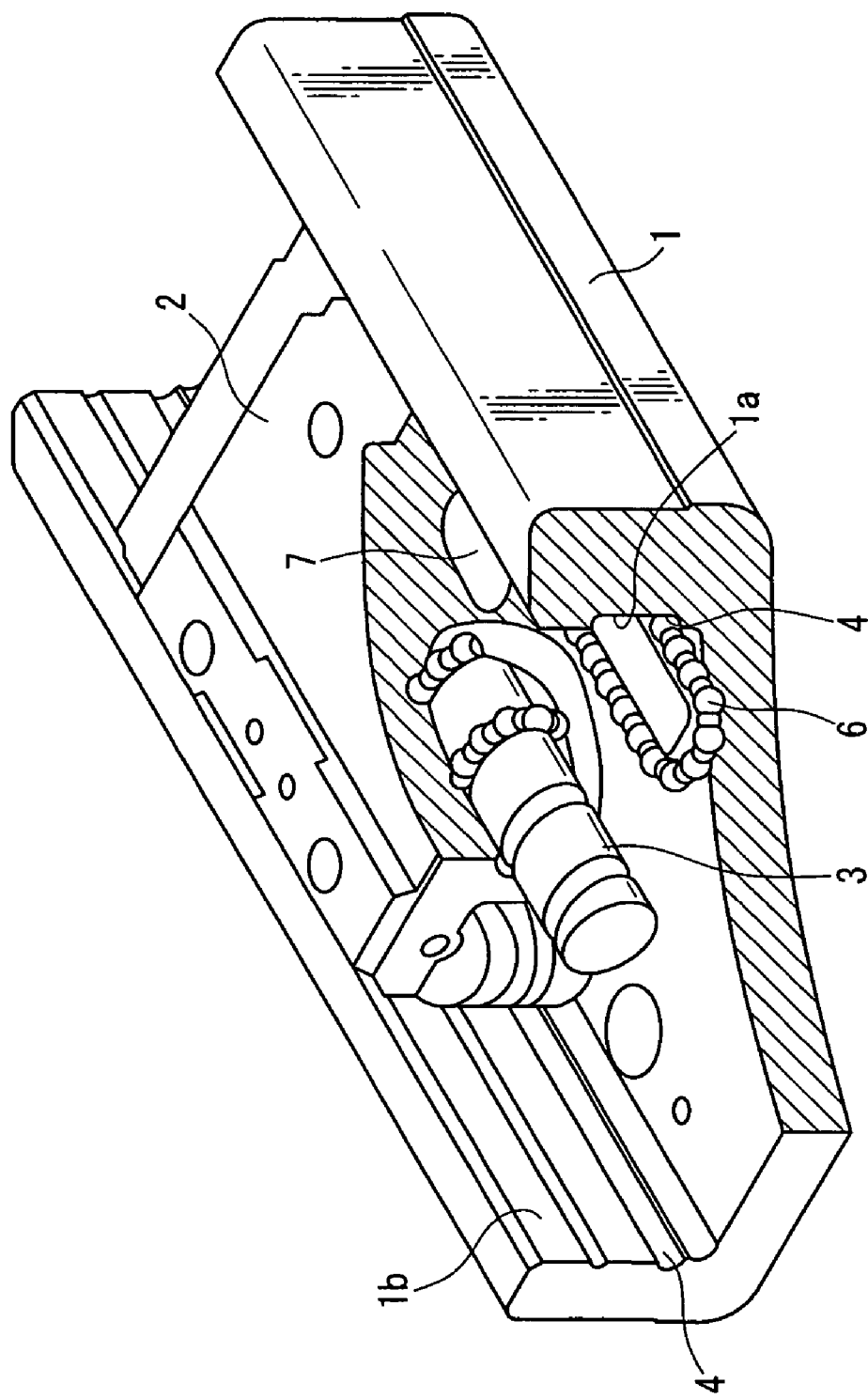
FIG. 14 shows, in partial cutout, a perspective view illustrating an actuator according to a conventional technique.

The actuator 110 shown in FIGS. 12 and 13 comprises a base block 112 having a pair of pressure fluid inlet/outlet ports 111a, 111b. The actuator 110 further comprises an unillustrated cylinder chamber formed therein, a piston rod 114 which is connected to a piston (not shown) that is displaceable along the cylinder chamber, and a slider 116 connected to the forward end of the piston rod 114 which is displaceable integrally with the piston rod 114.

The base block 112 functions as a frame. The base block 112, which is formed in an integrated manner, comprises a pair of thin-walled side end sections 112a, 112b that are formed with a plurality of attachment holes 117, and a central expanded section 112c that expands upwardly between the pair of side end sections 112a, 112b.

A plurality of fixed resin sliding members 118 and a plurality of movable resin sliding members 120, which are separated from each other by predetermined distances in the axial direction respectively, are provided between the base block 112, which operates in a fixed state, and the movable slider 116. More specifically, the fixed resin sliding members 118 number four in total, including two on the upper surface and two on both side surfaces. The fixed resin sliding members 118 are fixed to ends of a plurality of long grooves 122 formed on inner wall surfaces (upper surface and both side surfaces) of the fixed base block 112. The movable resin sliding members 120 number four in total, including two on the upper surface and two on the both side surfaces. The movable resin sliding members 120 are fixed to ends of a plurality of long grooves 124 formed on outer wall surfaces (upper surface and both side surfaces) of the movable slider 116.

The plurality of fixed resin sliding members 118 and the plurality of movable resin sliding members 120 are provided and operated so as not to come into abutment with each other, in the same manner as the actuator 80 described above.

The fixed resin sliding members 96, 118 and the movable resin sliding members 98, 120, as shown in FIGS. 10 to 13 respectively, are arranged to provide functions and effects that are the same as those of the resin sliding members 34 shown in FIG. 3. Therefore, detailed explanation thereof has been omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An actuator comprising:
a frame;
a plurality of sliding grooves formed in said frame;
a driving source arranged for said frame;
a driving force-transmitting mechanism for transmitting a driving force of said driving source;
a slider that makes reciprocating motion in an axial direction of said frame on the basis of said driving force transmitted from said driving force-transmitting mechanism;
a plurality of installation grooves identical in number to said plurality of sliding grooves, said installation grooves being formed on an outer wall surface of said slider opposing said plurality of sliding grooves, respectively, said installation grooves and said sliding grooves having the same radius of curvature; and
a guide mechanism comprising a plurality of resin sliding members disposed both in said sliding grooves and in said installation grooves and being interposed between an outer wall surface of said slider and an inner wall surface of said frame, said resin sliding members being fixed to said frame and/or said slider and being slidable in at least one of said installation grooves and said sliding grooves, wherein said resin sliding members guide said slider when said slider is displaced along said frame,
said plurality of resin sliding members comprising:
a pair of first resin sliding members installed in a pair of first installation grooves formed on said slider and which make sliding movement along first sliding grooves formed on a bottom wall section of said frame;
a pair of second resin sliding members installed in a pair of second installation grooves formed on said slider and which make sliding movement along second sliding grooves formed on side wall sections of said frame; and
a pair of third resin sliding members installed in a pair of third installation grooves formed on said slider and which make sliding movement along third sliding grooves formed on said side wall sections of said frame,
wherein each of said pairs of first resin sliding members has an axial center disposed on a inner virtual circle that is disposed concentrically inwardly by a predetermined distance with respect to an outer virtual circle, wherein said outer virtual circle intersects axial centers of said pairs of second and third resin sliding members.

2. The actuator according to claim 1, wherein each of said resin sliding members has a columnar shape, wherein said resin sliding members are retained in installation grooves formed on side surfaces of said slider.

3. The actuator according to claim 1, wherein each of said resin sliding members is composed of a hollow cylindrical member formed of a resin material, and a core member formed of a metal material, said core member being inserted into said cylindrical member.

4. The actuator according to claim 3, wherein said resin sliding members are fixed by a pair of plates installed to respective end surfaces of said slider.

5. The actuator according to claim 1, wherein said frame comprises a bottom wall section and a pair of side wall sections, said side wall sections being opposed to one another with said bottom wall section intervening therebetween;

said plurality of sliding grooves being formed in said bottom wall section and in said pair of side wall sections; and said slider being disposed between said pair of said wall sections of said frame.

6. The actuator according to claim 1, wherein said driving source comprises a rotary driving source.

7. The actuator according to claim 1, wherein said driving source comprises a fluid pressure cylinder including a cylinder tube in which a piston is accommodated, and said driving force-transmitting mechanism comprises a piston rod displaceable integrally with said piston, said slider being connected to a forward end of said piston rod via a connecting block.

8. The actuator according to claim 1, wherein said plurality of resin sliding members comprises fixed resin sliding members retained by said frame and movable resin sliding members retained by said slider.

* * * * *